(12) United States Patent
Lee

(10) Patent No.: US 12,395,000 B2
(45) Date of Patent: Aug. 19, 2025

(54) AUTONOMOUSLY ACTIVATED ELECTRIC ENERGY STORAGE DEVICE AND CONTROL METHOD THEREOF

(71) Applicants: GOODRICH PLUS ENERGY TECHNOLOGY LTD., New Taipei (TW); Chih-Wei Lee, New Taipei (TW)

(72) Inventor: Chih-Wei Lee, New Taipei (TW)

(73) Assignees: GOODRICH PLUS ENERGY TECHNOLOGY LTD., New Taipei (TW); Chih-Wei Lee, New Taipei (TW)

( * ) Notice: Subject to any disclaimer, the term of this patent is extended or adjusted under 35 U.S.C. 154(b) by 659 days.

(21) Appl. No.: 17/827,857

(22) Filed: May 30, 2022

(65) Prior Publication Data

US 2023/0268759 A1 Aug. 24, 2023

(30) Foreign Application Priority Data

Feb. 23, 2022 (TW) ................... 111106466

(51) Int. Cl.
*H02J 7/00* (2006.01)
*H01M 10/42* (2006.01)
(Continued)

(52) U.S. Cl.
CPC ..... *H02J 7/007194* (2020.01); *H01M 10/425* (2013.01); *H01M 10/441* (2013.01);
(Continued)

(58) Field of Classification Search
CPC .. H02J 7/342; H02J 7/007; H02J 7/194; H02J 7/0014; B60L 53/53
(Continued)

(56) References Cited

U.S. PATENT DOCUMENTS 6,204,769 B1 * 3/2001 Arai ................ H01M 10/48
340/455
10,093,191 B2 * 10/2018 Keller ................ B60L 53/14
(Continued)

FOREIGN PATENT DOCUMENTS

CN 101471460 A 7/2009
CN 201741761 U 2/2011

*Primary Examiner* — Julian D Huffman
*Assistant Examiner* — Ryu-Sung P. Weinmann
(74) *Attorney, Agent, or Firm* — Li & Cai Intellectual Property (USA) Office

(57) ABSTRACT

An autonomously activated electric energy storage device and a control method thereof are provided. The autonomously activated electric energy storage device includes a first battery cell, a second battery cell, a temperature detector, a first bidirectional charger, a second bidirectional charger and a control circuit. When the control circuit determines through the temperature detector that a battery cell temperature is equal to or lower than a low working temperature limit, the control circuit allows the first bidirectional charger to be electrically conducted with the first battery cell and the second bidirectional charger to be electrically conducted with the second battery cell, and the first battery cell and the second battery are controlled to perform power transfer therebetween through the first and the second bidirectional charger until temperatures of the first battery cell and the second battery cell are both higher than the low working temperature limit.

13 Claims, 7 Drawing Sheets

(51) Int. Cl.
    *H01M 10/44*      (2006.01)
    *H01M 10/46*      (2006.01)
(52) U.S. Cl.
    CPC ....... *H01M 10/443* (2013.01); *H02J 7/00034* (2020.01); *H02J 7/0014* (2013.01); *H02J 7/00714* (2020.01); *H02J 7/007182* (2020.01); *H01M 2010/4278* (2013.01); *H01M 10/46* (2013.01)
(58) Field of Classification Search
    USPC ........................................................ 320/103
    See application file for complete search history.

(56)              References Cited

U.S. PATENT DOCUMENTS

2014/0285135 A1*   9/2014   Ji .......................... H02J 7/0013
                                                        320/129
2019/0207396 A1*   7/2019   Chen ..................... H02J 7/0016

\* cited by examiner

AUTONOMOUSLY ACTIVATED ELECTRIC ENERGY STORAGE DEVICE AND CONTROL METHOD THEREOF

CROSS-REFERENCE TO RELATED PATENT APPLICATION

This application claims the benefit of priority to Taiwan Patent Application No. 111106466, filed on Feb. 23, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a battery energy storage device and a control method thereof, and more particularly to a battery energy storage device for selectively transferring power and a control method thereof.

BACKGROUND OF THE DISCLOSURE

In recent years, many industrial countries have increased their attention to air pollution. One of the main reasons for air pollution is annual growth of carbon emission, and exhaust gas emitted by vehicles is one of many reasons that cause the carbon emission to increase annually. Therefore, many countries have begun to pay great attention to the research and development of electric vehicles in hope of reducing the carbon emission.

A battery module is a power source of an electric vehicle. The battery module includes multiple battery cells. Not only does the charging efficiency of the battery cells need to meet consumer requirements, but cycle life and safety of the battery cells are also very important. The type of the battery module currently used in the electric vehicles can be, for example, a lead-acid battery module, a nickel-metal hydride battery module, and a lithium iron phosphate battery module, and the battery cells of each battery module correspond to a different low working temperature. When a temperature of the battery cells is lower than the low working temperature due to a temperature drop of the surrounding environment, activity of an electrolyte of the battery cells decreases rapidly, such that power of a battery loses rapidly and a usable time of the battery is significantly reduced.

In order to prevent a temperature of the battery from being lower than the low working temperature, the current solution is to heat the battery through an electric heating rod disposed on the battery when the temperature of the battery is lower than the low working temperature. In this way, the temperature of the battery can be higher than the low working temperature. However, the electric heating rod takes up space in the battery module, and the electric heating rod can only be activated by consumption of the power stored in the battery module.

SUMMARY OF THE DISCLOSURE

In response to the above-referenced technical inadequacies, the present disclosure provides an autonomously activated electric energy storage device and a control method thereof.

In one aspect, the present disclosure provides an autonomously activated electric energy storage device, which includes a first battery cell, a second battery cell, a temperature detector, a first bidirectional charger, a second bidirectional charger, and a control circuit. The control circuit is connected to the first battery cell, the second battery cell, the temperature detector, the first bidirectional charger and the second bidirectional charge. When the control circuit determines through the temperature detector that at least one of temperatures of the first battery cell and the second battery cell is equal to or lower than a low working temperature limit, the control circuit allows the first bidirectional charger to be electrically conducted with the first battery cell and the second bidirectional charger to be electrically conducted with the second battery cell, and the first battery cell and the second battery cell are controlled to perform power transfer therebetween through the first bidirectional charger and the second bidirectional charger until the temperatures of the first battery cell and the second battery cell are both higher than the low working temperature limit.

In another aspect, the present disclosure provides a control method of an autonomously activated electric energy storage device, which includes: detecting temperatures of a first battery cell and a second battery cell; determining whether or not at least one of the temperatures of the first battery cell and the second battery cell is equal to or lower than a low working temperature limit; and controlling, when the at least one of the temperatures of the first battery cell and the second battery cell is equal to or lower than the low working temperature limit, the first battery cell and the second battery cell to perform power transfer therebetween until the temperatures of the first battery cell and the second battery cell are both higher than the low working temperature limit.

Therefore, in the autonomously activated electric energy storage device and the control method thereof provided by the present disclosure, the power transfer between the first battery cell and the second battery cell can be continuously performed. When the power transfer is performed between the two battery cells, an energy level within each battery cell is changed, and a kinetic energy is generated by the change of the energy level. When the kinetic energy is generated within the battery cell, the battery cell can be switched from a resting state to an activated state. A temperature of the battery cell in the activated state is not easily decreased to be lower than the low working temperature limit due to environmental factors. Accordingly, even if the battery cell is in a low temperature environment, the power of the battery cell is not quickly lost and the life of the battery cell will not be damaged. In addition, each of the battery cells can be in the activated state completely through the continuous power transfer among the multiple battery cells (without through any external power). Based on the law of conservation of energy, no matter how the power is transferred, the total power of the battery cells remains unchanged, and a power-saving effect can also be achieved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
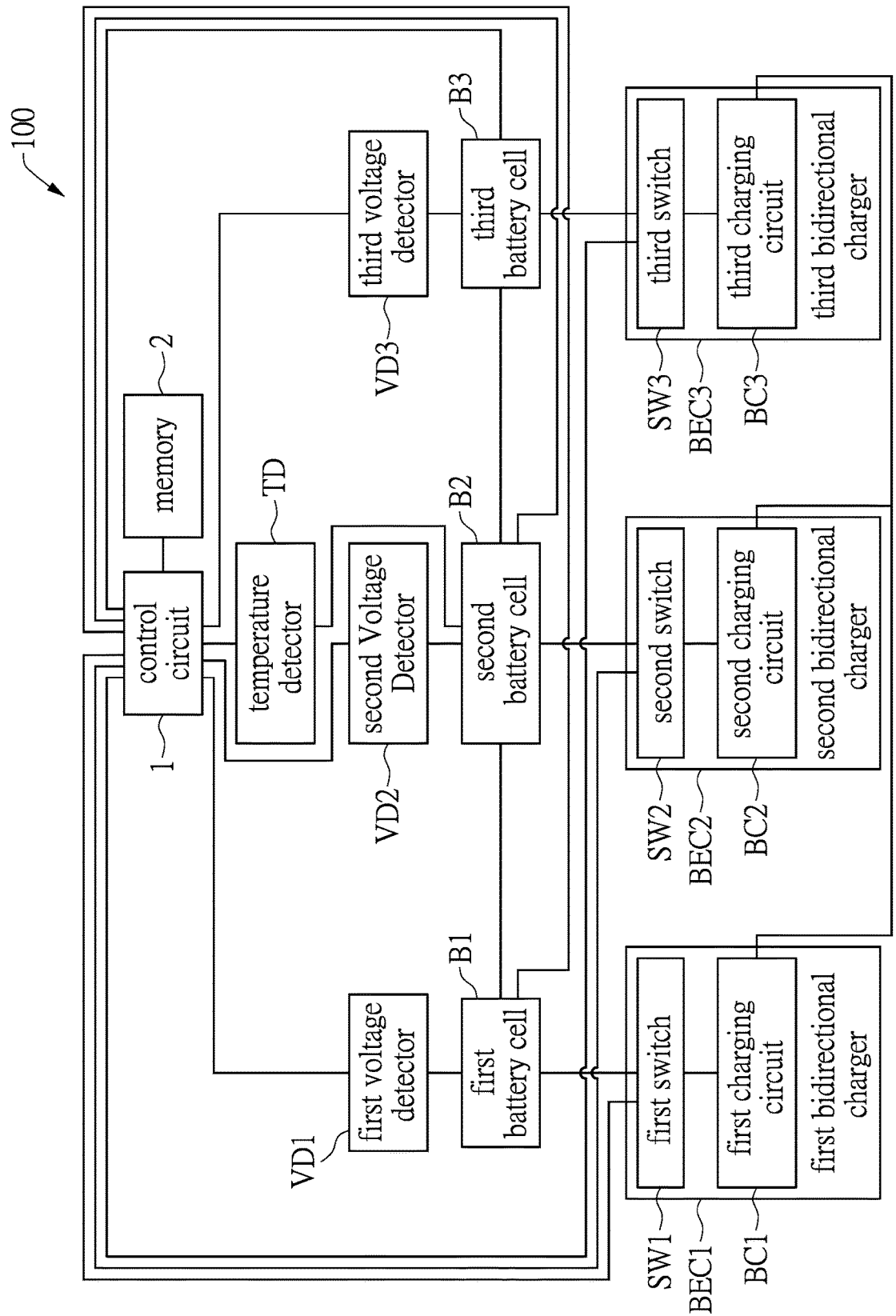
FIG. 1 is a functional block diagram of an autonomously activated electric energy storage device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a functional block diagram of an autonomously activated electric energy storage device according to a first embodiment of the present disclosure. Referring to FIG. 1, an autonomously activated electric energy storage device 100 includes a first battery cell B1, a second battery cell B2, a third battery cell B3, a temperature detector TD and a control circuit 1. The first battery cell B1, the second battery cell B2 and the third battery cell B3 are electrically connected to each other, and the temperature detector TD is electrically connected to the second battery cell B2 and detects a temperature of the second battery cell B2. Since the first battery cell B1, the second battery cell B2 and the third battery cell B3 are all packaged in a casing of the autonomously activated electrical energy storage device 100, the temperature of the second battery cell B2 is approximately the same as the temperatures of the first battery cell B1 and the third battery cell B3.

The control circuit 1 can be, for example, one or any combination of an application-specific integrated circuit (ASIC), a field-programmable gate array (FPGA), and a system-on-chip (SOC), and can be combined with other related circuit components and firmware, so as to carry out the following functional operations.

The control circuit 1 is electrically connected to the temperature detector TD, so as to obtain a temperature of a battery cell. The autonomously activated electrical energy storage device 100 further includes a first voltage detector VD1, a second voltage detector VD2 and a third voltage detector VD3. The first voltage detector VD1, the second voltage detector VD2 and the third voltage detector VD3 are respectively and electrically connected to the first battery cell B1, the second battery cell B2 and the third battery cell B3, so as to detect a first voltage of the first battery cell B1, a second voltage of the second battery cell B2 and a third voltage of the third battery cell B3. The control circuit 1 is electrically connected to the first voltage detector VD1, the second voltage detector VD2 and the third voltage detector VD3, so as to obtain the first voltage, the second voltage and the third voltage.

The autonomously activated electrical energy storage device 100 further includes a first bidirectional charger BEC1, a second bidirectional charger BEC2, a third bidirectional charger BEC3, and a memory 2. A first end of the first bidirectional charger BEC1 is connected to the first battery cell B1, a first end of the second bidirectional charger BEC2 is connected to the second battery cell B2, and a first end of the third bidirectional charger BEC3 is connected to the third battery cell B3. A second end of the first bidirectional charger BEC1, a second end of the second bidirectional charger BEC2, and a second end of the third bidirectional charger BEC3 are connected to one another.

The control circuit 1 is electrically connected to the first bidirectional charger BEC1, the second bidirectional charger BEC2, the third bidirectional charger BEC3 and the memory 2. The memory 2 stores a power transfer program, and the control circuit 1 is used to execute the power transfer program stored in the memory 2. The power transfer program includes a plurality of adjustable parameters, and these adjustable parameters include a low working temperature limit, a first voltage setting value of the first battery cell B1, a second voltage setting value of the second battery cell B2, a third voltage setting value of the third battery cell B3, a maximum continuous charge current, a maximum continuous discharge current, a discharge peak current, a discharge peak time, an upper charge voltage limit and a discharge cutoff voltage. In addition, the temperature of the battery cell that the control circuit 1 obtains from the temperature detector TD each time is stored in the memory 2.

When the control circuit 1 executes the power transfer program, the control circuit 1 determines whether or not the temperature of the battery cell is equal to or lower than the low working temperature limit (e.g., minus 10 degrees Celsius). When the control circuit 1 determines that the temperature of the battery cell is equal to or lower than the low working temperature limit, the control circuit 1 adjusts the first voltage setting value, the second voltage setting value and the third voltage setting value. Further, the control circuit 1 controls the first bidirectional charger BEC1 and the first battery cell B1 to be switched from a cut-off state to a conducting state, the second bidirectional charger BEC2 and the second battery cell B2 to be switched from the cut-off state to the conducting state, and the third bidirectional charger BEC3 and the third battery cell B3 to be switched from the cut-off state to the conducting state.

In detail, the first bidirectional charger BEC1 includes a first charging circuit BC1 and a first switch SW1, the first switch SW1 is connected between a first end of the first charging circuit BC1 and the first battery cell B1, and the first switch SW1 is normally in the cut-off state. The second bidirectional charger BEC2 includes a second charging circuit BC2 and a second switch SW2, the second switch SW2 is connected between a first end of the second charging circuit BC2 and the second battery cell B2, and the second switch SW2 is normally in the cut-off state. The third bidirectional charger BEC3 includes a third charging circuit BC3 and a third switch SW3, the third switch SW3 is connected between a first end of the third charging circuit BC3 and the third battery cell B3, and the third switch SW3 is normally in the cut-off state. A second end of the first charging circuit BC1, a second end of the second charging circuit BC2, and a second end of the third charging circuit BC3 are connected to each other.

The control circuit 1 is connected to the first switch SW1, the second switch SW2 and the third switch SW3, and controls the first switch SW1, the second switch SW2 and the third switch SW3 to be switched from the cut-off state to the conducting state or from the conducting state to the cut-off state.

For example, the first switch SW1, the second switch SW2 and the third switch SW3 are metal-oxide-silicon (MOS) transistors. Voltage values of three signals provided by the control circuit 1 to the first switch SW1, the second switch SW2 and the third switch SW3 are each equal to or higher than a threshold voltage of the MOS transistor, so as to control the first switch SW1, the second switch SW2 and the third switch SW3 to be switched from the cut off state to the conducting state.

When the control circuit 1 adjusts the first voltage setting value, the second voltage setting value and the third voltage setting value and controls the first switch SW1, the second switch SW2 and the third switch SW3 to be in the conducting state, power transfer is performed among the first battery cell B1, the second battery cell B2 and the third battery cell B3, so that the first battery cell B1, the second battery cell B2 and the third battery cell B3 can respectively reach the adjusted first voltage setting value, the adjusted second voltage setting value and the adjusted third voltage setting value. There are various configurations of the power transfer. For example, the power transfer can be performed between the first battery cell B1 and the second battery cell B2 through the first bidirectional charger BEC1 and the second bidirectional charger BEC2, the power transfer can be performed between the first battery cell B1 and the third battery cell B3 through the first bidirectional charger BEC1 and the third bidirectional charger BEC3, or the power transfer can be performed between the second battery cell B2 and the third battery cell B3 through the second bidirectional charger BEC2 and the third bidirectional charger BEC3. When the power transfer is performed among the first battery cell B1, the second battery cell B2 and the third battery cell B3, energy levels within the first battery cell B1, the second battery cell B2 and the third battery cell B3 can be changed, and the change of the energy level generates a kinetic energy. The first battery cell B1, the second battery cell B2 and the third battery cell B3 can be in an activated state due to the kinetic energy generated within the first battery cell B1, the second battery cell B2 and the third battery cell B3.

When the first battery cell B1, the second battery cell B2, and the third battery cell B3 are in the activated state, each of the temperatures of the first battery cell B1, the second battery cell B2, and the third battery cell B3 is gradually increased. When any one of these temperatures is higher than the low working temperature limit, the control circuit 1 controls the first switch SW1, the second switch SW2 and the third switch SW3 to be switched from the conducting state to the cut-off state, so as to stop the power transfer among the first battery cell B1, the second battery cell B2 and the third battery cell B3.

Figure 2A:
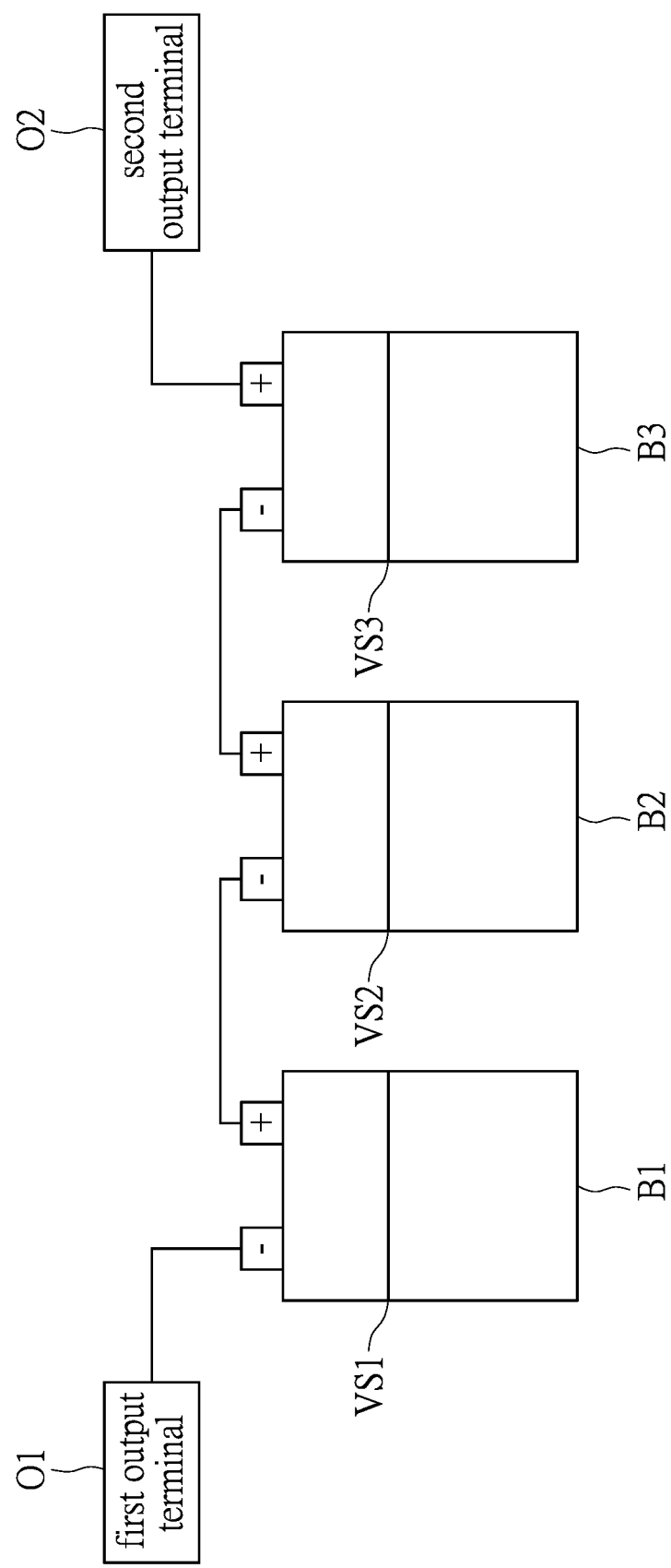
FIG. 2A is a schematic view showing voltages of a plurality of battery cells being in a balanced state.

FIG. 2A is a schematic view showing voltages of a plurality of battery cells being in a balanced state. Referring to FIG. 2A, the first battery cell B1, the second battery cell B2 and the third battery cell B3 are connected in series with each other. In addition, a negative electrode of the first battery cell B1 and a positive electrode of the third battery cell B3 are connected to a first output terminal O1 and a second output terminal O2, respectively. A first voltage setting value VS1 of the first battery cell B1, a second voltage setting value VS2 of the second battery cell B2, and a third voltage setting value VS3 of the third battery cell B3 are initially set to be equal to each other (e.g., 3.2 volts). When voltages of the first battery cell B1, the second battery cell B2 and the third battery cell B3 respectively reach the first voltage setting value VS1, the second voltage setting value VS2 and the third voltage setting value VS3, the voltages of the first battery cell B1, the second battery cell B2 and the third battery cell B3 are in the balanced state.

Figure 2B:
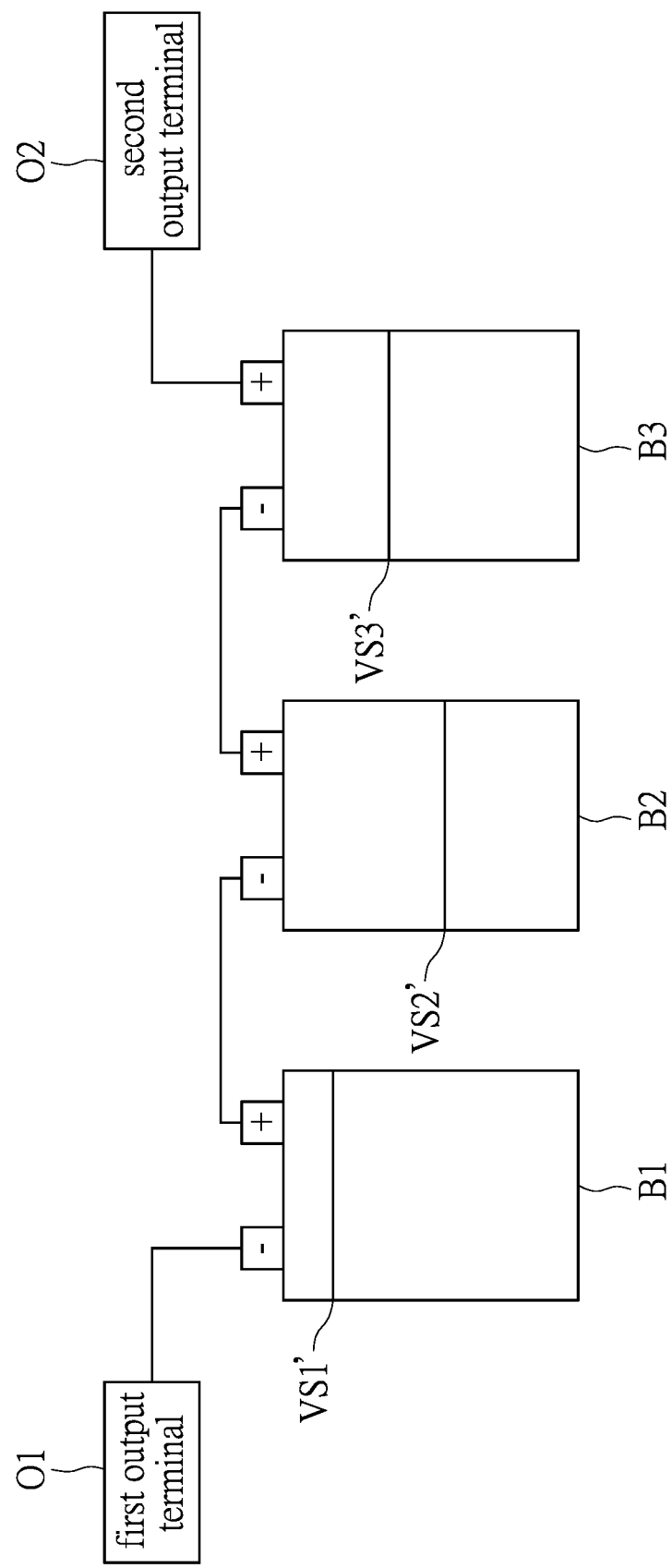
FIG. 2B is a schematic view showing the voltages of the plurality of battery cells being in an unbalanced state.

FIG. 2B is a schematic view showing the voltages of the plurality of battery cells being in an unbalanced state. Referring to FIG. 2B, when a temperature of the surrounding environment drops rapidly, the temperature of the battery cell can be lower than the low working temperature limit. The control circuit 1 adjusts the first voltage setting value VS1, the second voltage setting value VS2 and the third voltage setting value VS3, and an adjusted first voltage setting value VS1', an adjusted second voltage setting value VS2' and an adjusted third voltage setting values VS3' are 4 volts, 2.5 volts and 3.1 volts, respectively. In order to reach the adjusted first voltage setting value VS1', the adjusted second voltage setting value VS2' and the adjusted third voltage setting value VS3', the power transfer is performed among the first battery cell B1, the second battery cell B2 and the third battery cell B3. Regarding the power transfer, for example, a part of power of the first battery cell B1 can be transferred to the second battery cell B2 and the third battery cell B3, a part of power of the second battery cell B2 can be transferred to the first battery cell B1 and the third battery cell B3, or a part of power of the third battery cell B3 can be transferred to the first battery cell B1 and the second battery cell B2. When the voltages of the first battery cell B1, the second battery cell B2, and the third battery cell B3 respectively reach the adjusted first voltage setting value VS1', the adjusted second voltage setting value VS2', and the adjusted third voltage setting value VS3', the voltages of the first battery cell B1, the second battery cell B2 and the third battery cell B3 are in the unbalanced state.

Regarding the power transfer among the first battery cell B1, the second battery cell B2 and the third battery cell B3, in addition to the configurations shown in FIG. 2A and FIG. 2B, other configurations are also possible.

For example, initially, the voltages of the first battery cell B1, the second battery cell B2 and the third battery cell B3 are not completely the same and are in the unbalanced state. The control circuit 1 adjusts the first voltage setting value, the second voltage setting value and the third voltage setting value, and controls the first bidirectional charger BEC1, the second bidirectional charger BEC2 and the third bidirectional charger BEC3. When the voltages of the first battery cell B1, the second battery cell B2 and the third battery cell B3 respectively reach the adjusted first voltage setting value, the adjusted second voltage setting value and the adjusted third voltage setting value, the first battery cell B1, the battery cell B2 and the third battery cell B3 are transformed from the unbalanced state to the balanced state.

For example, initially, the voltages of the first battery cell B1, the second battery cell B2 and the third battery cell B3 are not completely the same and are in a first unbalanced state. The control circuit 1 adjusts the first voltage setting value, the second voltage setting value and the third voltage setting value, and controls the first bidirectional charger BEC1, the second bidirectional charger BEC2 and the third bidirectional charger BEC3. When the first battery cell B1, the second battery cell B2 and the third battery cell B3 respectively reach the adjusted first voltage setting value, the adjusted second voltage setting value and the adjusted third voltage setting value, the first battery cell B1, the second battery cell B2 and the third battery cell B3 are transformed from the first unbalanced state to a second unbalanced state. The first voltage setting value, the second voltage setting value and the third voltage setting value that are in the second unbalanced state are respectively different from the first voltage setting value, the second voltage setting value and the third voltage setting value that are in the first unbalanced state.

Therefore, the power transfer among the first battery cell B1, the second battery cell B2 and the third battery cell B3 is configured to include transformations from the balanced state to the unbalanced state, from the unbalanced state to the balanced state, or from the first unbalanced state to the second unbalanced state. However, in whichever configuration mentioned above, the total power of the first battery cell B1, the second battery cell B and the third battery cell B3 remains unchanged.

Second Embodiment

Figure 3:
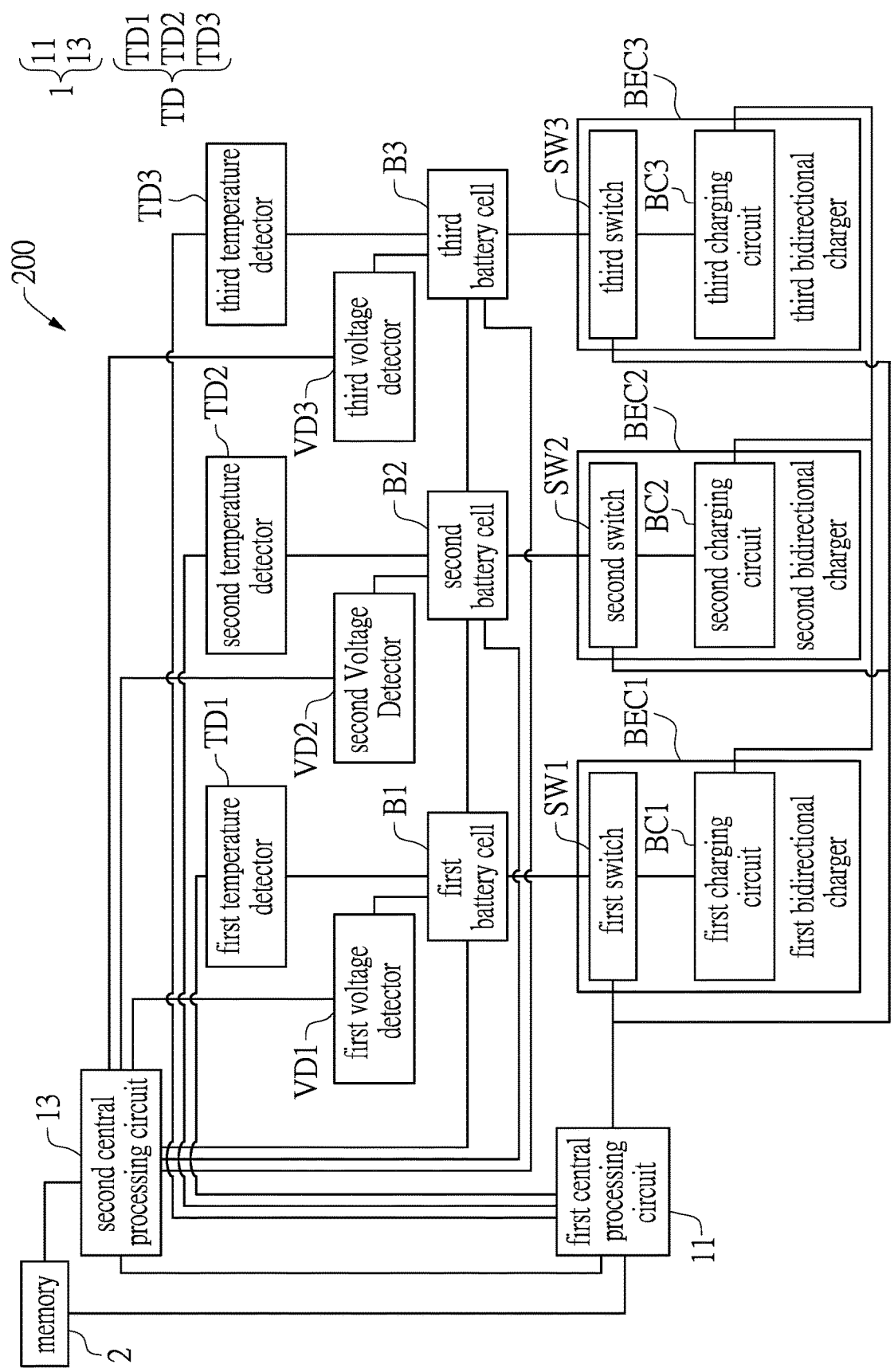
FIG. 3 is a functional block diagram of an autonomously activated electric energy storage device according to a second embodiment of the present disclosure.

FIG. 3 is a functional block diagram of an autonomously activated electric energy storage device according to a second embodiment of the present disclosure. Comparing FIG. 3 with FIG. 1, the main difference between the second embodiment and the first embodiment is as follows: in the second embodiment, the temperature detector TD of an autonomously activated electrical energy storage device 200 includes a first temperature detector TD1, a second temperature detector TD2 and a third temperature detector TD3. The first temperature detector TD1, the second temperature detector TD2 and the third temperature detector TD3 are respectively and electrically connected to the first battery cell B1, the second battery cell B2 and the third battery cell B3, so as to respectively detect the temperatures of the first battery cell B1, the second battery cell B2, and the third battery cell B3.

The control circuit 1 of the autonomously activated electrical energy storage device 200 includes a first central processing circuit 11 and a second central processing circuit 13. The first central processing circuit 11 is electrically connected to the first temperature detector TD1, the second temperature detector TD2, the third temperature detector TD3, the first bidirectional charger BEC1, the second bidirectional charger BEC2, the third bidirectional charger BEC3, and the memory 2. The first central processing circuit 11 obtains the temperatures of the first battery cell B1, the second battery cell B2 and the third battery cell B3 respectively from the first temperature detector TD1, the second temperature detector TD2 and the third temperature detector TD3. Each time the first central processing circuit 11 obtains the temperatures of the first battery cell B1, the second battery cell B2 and the third battery cell B3, the first central processing circuit 11 stores these temperatures into the memory 2.

The first central processing circuit 11 is connected to the first switch SW1 of the first bidirectional charger BEC1, the second switch SW2 of the second bidirectional charger BEC2, and the third switch SW3 of the third bidirectional charger BEC3. The first central processing circuit 11 controls the first switch SW1, the second switch SW2 and the third switch SW3 to be switched from the cut-off state to the conducting state, or to be switched from the conducting state to the cut-off state.

The second central processing circuit 13 is electrically connected to the first central processing circuit 11 and the memory 2, and the first central processing circuit 11 and the second central processing circuit 13 execute the power transfer program stored in the memory 2.

The second central processing circuit 13 is further electrically connected to the first voltage detector VD1, the second voltage detector VD2 and the third voltage detector VD3, so as to obtain the first voltage of the first battery cell B1, the second voltage of the second battery cell B2 and the third voltage of the third battery cell B3.

When the first central processing circuit 11 obtains the temperatures of the first battery cell B1, the second battery cell B2 and the third battery cell B3 from the first temperature detector TD1, the second temperature detector TD2 and the third temperature detector TD3, the first central processing circuit 11 determines whether or not at least one of the temperatures of the first battery cell B1, the second battery cell B2 and the third battery cell B3 is equal to or lower than the low working temperature limit preset by the power transfer program. When the first central processing circuit 11 determines that at least one of the temperatures of the first battery cell B1, the second battery cell B2 and the third battery cell B3 is equal to or lower than the low working temperature limit, the first central processing circuit 11 controls the first switch SW1, the second switch SW2 and the third switch SW3 to be switched from the cut-off state to the conducting state and sends a program update command to the second central processing circuit 13.

When the second central processing circuit 13 reads the program update command from the first central processing circuit 11, the second central processing circuit 13 updates the first voltage setting value of the first battery cell B1 in the power transfer program, the second voltage setting value of the second battery cell B2 in the power transfer program and the third voltage setting value of the third battery cell B3 in the power transfer program, so as to control the first battery cell B1, the second battery cell B2 and the third battery cell B3 to perform the power transfer.

Through the first voltage detector VD1, the second voltage detector VD2 and the third voltage detector VD3, the second central processing circuit 13 determines whether or not the voltages of the first battery cell B1, the second battery cell B2 and the third battery cell B3 respectively reach the first voltage setting value, the second voltage setting value and the third voltage setting value updated for a first time. When the second central processing circuit 13 determines that the voltages of the first battery cell B1, the second battery cell B2 and the third battery cell B3 respectively reach the first voltage setting value, the second voltage setting value and the third voltage setting value updated for the first time, the first central processing circuit 11 determines again whether or not at least one of the temperatures of the first battery cell, the second battery cell temperature and the third battery cell is equal to or lower than the low working temperature limit. When the first central processing circuit 11 determines that at least one of the temperatures of the first battery cell, the second battery cell and the third battery cell is equal to or lower than the low working temperature limit, the first central processing circuit 11 instructs the second central processing circuit 13 to once again update the first voltage setting value, the second voltage setting value and the third voltage setting value.

For example, when the voltages of the first battery cell B1, the second battery cell B2 and the third battery cell B3 are initially in the balanced state, the first central processing circuit 11 determines whether or not at least one of the temperatures of the first battery cell B1, the second battery cell B2 and the third battery cell B3 is equal to or lower than the low working temperature limit. When the first central processing circuit 11 determines that at least one of the temperatures of the first battery cell B1, the second battery cell B2 and the third battery cell B3 is equal to or lower than the low working temperature limit, the first central processing circuit 11 instructs the second central processing circuit 13 to update the first voltage setting value, the second voltage setting value and the third voltage setting value for the first time. The first voltage setting value, the second voltage setting value and the third voltage setting value updated after the first time are not completely the same. When the voltages of the first battery cell B1, the second battery cell B2 and the third battery cell B3 respectively reach the first voltage setting value, the second voltage setting value and the third voltage setting value updated after the first time, the first battery cell B1, the second battery cell B2 and the third battery cell B3 are transformed from the balanced state to the unbalanced state.

When the first battery cell B1, the second battery cell B2 and the third battery cell B3 are transformed from the balanced state to the unbalanced state, the first central processing circuit 11 determines whether or not at least one of the temperatures of the first battery cell B1, the second battery cell B2 and the third battery cell B3 is equal to or lower than the low working temperature limit again. When the first central processing circuit 11 determines that at least one of the temperatures of the first battery cell B1, the second battery cell B2 and the third battery cell B3 is equal to or lower than the low working temperature limit, the first central processing circuit 11 once again instructs the second central processing circuit 13 to update the first voltage setting value, the second voltage setting value and the third voltage setting value. The first voltage setting value, the second voltage setting value and the third voltage setting value updated after a second time are completely the same.

When the voltages of the first battery cell B1, the second battery cell B2 and the third battery cell B3 respectively reach the first voltage setting value, the second voltage setting value and the third voltage setting value updated after the second time, the first battery cell B1, the second battery cell B2 and the third battery cell B3 are transformed from the unbalanced state to the balanced state.

A quantity of the battery cells and connection relationships of the bidirectional chargers described above are merely examples for illustrative purposes, and the present disclosure is not limited thereto. For example, the autonomously activated electrical energy storage device 200 can further include a fourth battery cell, a fifth battery cell and a sixth battery cell, The fourth battery cell, the fifth battery cell and the sixth battery cell are respectively connected with the first battery cell B1, the second battery cell B2 and the third battery cell B3 in parallel. The first temperature detector TD1 is used to detect the temperatures of the first battery cell B1 and the fourth battery cell. The second temperature detector TD2 is used to detect the temperatures of the second battery cell B2 and the fifth battery cell. The third temperature detector TD3 is used to detect the temperatures of the third battery cell B3 and the sixth battery cell. The first bidirectional charger BEC1 is coupled to the first battery cell B1 and the fourth battery cell, the second bidirectional charger BEC2 is coupled to the second battery cell B2 and the fifth battery cell, and the third bidirectional charger BEC3 is coupled to the third battery cell and the sixth battery cell.

Third Embodiment

Figure 4:
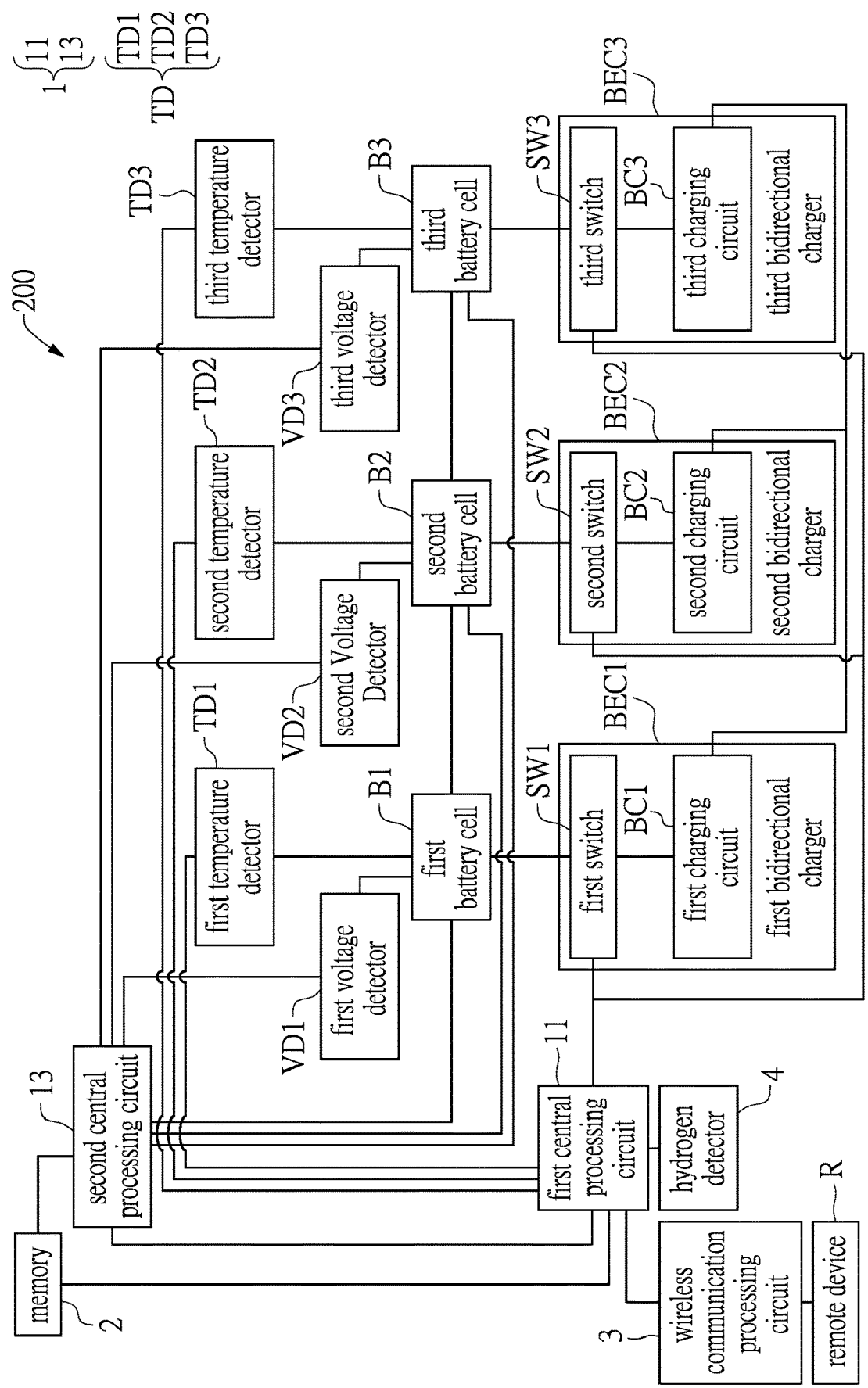
FIG. 4 is a functional block diagram of an autonomously activated electric energy storage device according to a third embodiment of the present disclosure.

FIG. 4 is a functional block diagram of an autonomously activated electric energy storage device according to a third embodiment of the present disclosure. Comparing FIG. 4 with FIG. 3, the main difference between the third embodiment and the second embodiment is as follows: in the third embodiment, an autonomously activated electric energy storage device 300 of FIG. 4 further includes a wireless communication processing circuit 3 and a hydrogen detector 4. The wireless communication processing circuit 3 is electrically connected to the first central processing circuit 11, and the wireless communication processing circuit 3 is used to electrically communicate with a remote device R. The remote device R can be, for example, a mobile communication device or a cloud server. The autonomously activated electric energy storage device 300 operates automatically according to the power transfer program stored in the memory 2. Further, when the wireless communication processing circuit 3 receives the program update command from the remote device R, the first central processing circuit 11 updates the power transfer program stored in the memory 2 according to the program update command. For example, the low working temperature limit and the maximum continuous charge current can be updated according to the program update command.

In addition, each time when the first central processing circuit 11 obtains the temperatures of the first battery cell, the second battery cell and the third battery respectively from the first temperature detector TD1, the second temperature detector TD2 and the third temperature detector TD3, the first central processing circuit 11 stores the temperatures of the first battery cell B1, the second battery cell B2 and the third battery cell B3 into the memory 2, and the wireless communication processing circuit 3 transmits the temperatures of the first battery cell B1, the second battery cell B2 and the third battery cell B3 to the remote device R.

The hydrogen detector 4 is electrically connected to the first central processing circuit 11, and the hydrogen detector 4 detects a hydrogen concentration in the autonomously activated electric energy storage device 300. Each time when the first central processing circuit 11 obtains the hydrogen concentration from the hydrogen detector 4, the first central processing circuit 11 stores the hydrogen concentration into the memory 2, and the wireless communication processing circuit 3 transmits the hydrogen concentration to the remote device R.

Since the autonomously activated electric energy storage device 300 continuously communicates with the remote device R, an engineer can monitor a temperature change of each of the battery cells and a hydrogen concentration change in the autonomously activated electric energy storage device 300 at any time. The engineer can update the power transfer program stored in the memory 2 according to the temperature change and the hydrogen concentration change.

Figure 5:
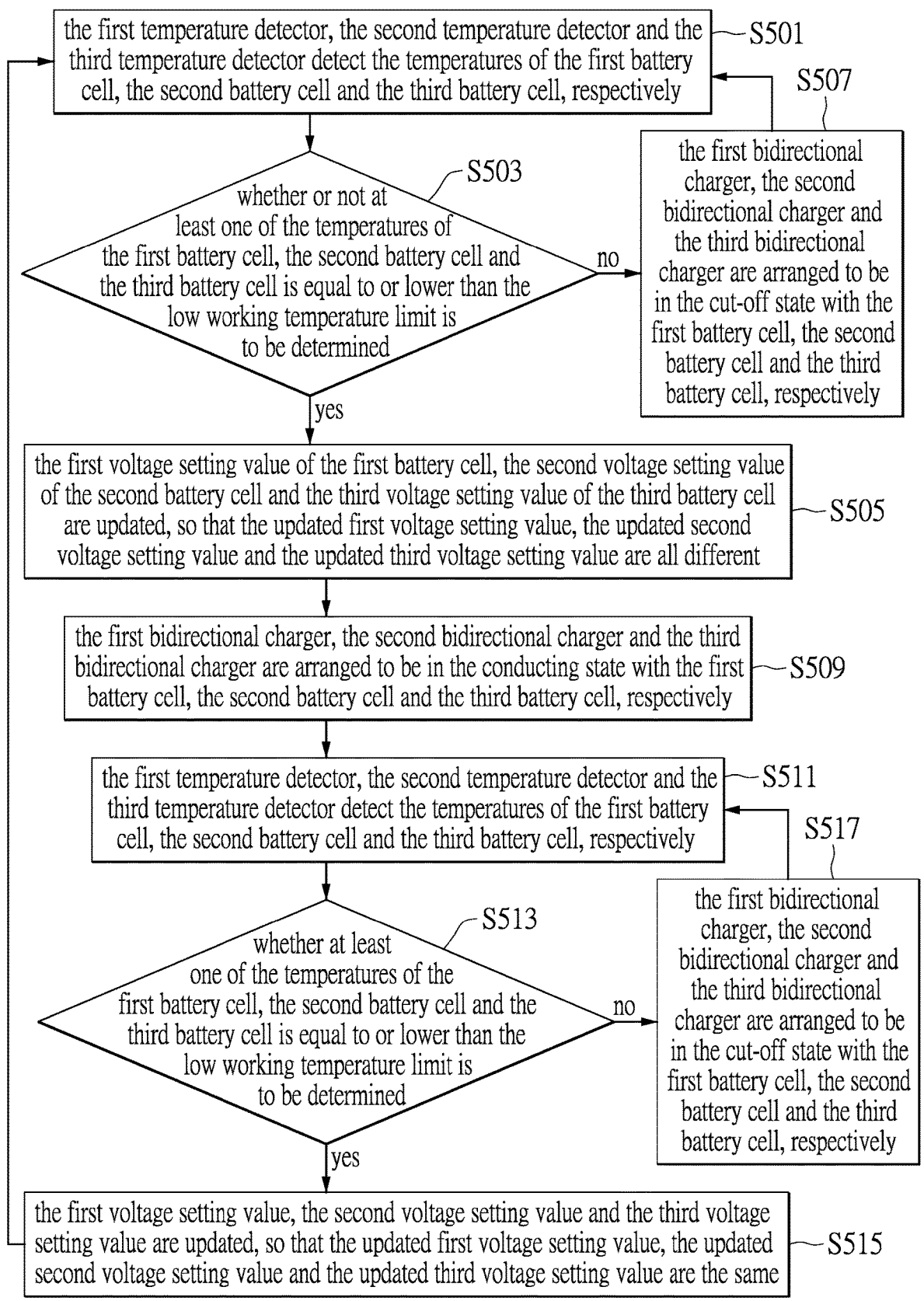
FIG. 5 is a flowchart of a control method of the autonomously activated electric energy storage device according to the first embodiment of the present disclosure.

FIG. 5 is a flowchart of a control method of the autonomously activated electric energy storage device according to the first embodiment of the present disclosure. As shown in FIG. 5, in step S501, the first temperature detector TD1, the second temperature detector TD2 and the third temperature detector TD3 detect the temperatures of the first battery cell B1, the second battery cell B2 and the third battery cell B3, respectively. The step S501 is followed by step S503. Specifically, the first voltage setting value of the first battery cell B1, the second voltage setting value of the second battery cell B2, and the third voltage setting value of the third battery cell B3 are all the same. When the first battery cell B1, the second battery cell B2 and the third battery cell B3 reach the same voltage setting value, the first battery cell B1, the second battery cell B2 and the third battery cell B3 are in the balanced state. For example, in the balanced state, the first voltage setting value, the second voltage setting value and the third voltage setting value are 5 volts, 5 volts and 5 volts, respectively.

In step S503, whether or not at least one of the temperatures of the first battery cell B1, the second battery cell B2 and the third battery cell B3 is equal to or lower than the low working temperature limit is to be determined. When at least one of the temperatures of the first battery cell B1, the second battery cell B2 and the third battery cell B3 is equal to or lower than the low working temperature limit, step S503 is followed by step S505. When the temperatures of the first battery cell, the second battery cell and the third battery cell are all higher than the low working temperature limit, step S503 is followed by step S507.

In step S505, the first voltage setting value of the first battery cell B1, the second voltage setting value of the second battery cell B2 and the third voltage setting value of the third battery cell B3 are updated, so that the updated first voltage setting value, the updated second voltage setting value and the updated third voltage setting value are all different. Then, step S505 is followed by step S509. Specifically, the updated first voltage setting value, the updated second voltage setting value and the updated third voltage setting value are all different. When the first battery cell B1, the second battery cell B2 and the third battery cell B3 reach three different voltage setting values, the first battery cell B1, the second battery cell B2 and the third battery cell B3 are in the unbalanced state. For example, when the first battery cell B1, the second battery cell B2 and the third battery cell B3 are in the unbalanced state, the first voltage setting value, the second voltage setting value and the third voltage setting value are 4.5 volts, 4.7 volts and 5.8 volts, respectively.

In step S507, the first bidirectional charger BEC1, the second bidirectional charger BEC2 and the third bidirectional charger BEC3 are arranged to be in the cut-off state with the first battery cell B1, the second battery cell B2 and the third battery cell B3, respectively. Then, the control method of FIG. 5 returns to step S501.

Specifically, when the first bidirectional charger BEC1, the second bidirectional charger BEC2 and the third bidirectional charger BEC3 are respectively in the cut-off state with the first battery cell B1, the second battery cell B2 and the third battery cell B3, such cut-off state is to be maintained. When the first bidirectional charger BEC1, the second bidirectional charger BEC2 and the third bidirectional charger BEC3 are respectively in the conducting state with the first battery cell B1, the second battery cell B2 and the third battery cell B3, such conducting state is to be switched to the cut-off state.

In step S509, the first bidirectional charger BEC1, the second bidirectional charger BEC2 and the third bidirectional charger BEC3 are arranged to be in the conducting state with the first battery cell B1, the second battery cell B2 and the third battery cell B3, respectively. Then, step S509 is followed by step S511.

Specifically, when the first bidirectional charger BEC1, the second bidirectional charger BEC2 and the third bidirectional charger BEC3 are respectively in the conducting state with the first battery cell B1, the second battery cell B2 and the third battery cell B3, such conducting state is to be maintained. When the first bidirectional charger BEC1, the second bidirectional charger BEC2 and the third bidirectional charger BEC3 are respectively in the cut-off state with the first battery cell B1, the second battery cell B2 and the third battery cell B3, such cut-off state is to be switched to the conducting state.

When the first bidirectional charger BEC1, the second bidirectional charger BEC2 and the third bidirectional charger BEC3 are respectively in the conducting state with the first battery cell B1, the second battery cell B2 and the third battery cell B3, electrical charges stored in the first battery cell B1 can be transferred to the second battery cell B2 and/or the third battery cell B3, the electrical charges stored in the second battery cell B2 can be transferred to the first battery cell B1 and/or the third battery cell B3, and the electrical charges stored in the third battery cell B3 can be transferred to the first battery cell B1 and/or the second battery cell B2.

In step S511, the first temperature detector TD1, the second temperature detector TD2 and the third temperature detector TD3 detect the temperatures of the first battery cell B1, the second battery cell B2 and the third battery cell B3, respectively. Step S511 is followed by step S513.

In step S513, whether or not at least one of the temperatures of the first battery cell B1, the second battery cell B2 and the third battery cell B3 is equal to or lower than the low working temperature limit is to be determined. When at least one of the temperatures of the first battery cell B1, the second battery cell B2 and the third battery cell B3 is equal to or lower than the low working temperature limit, step S513 is followed by step S515. When the temperatures of the first battery cell B1, the second battery cell B2 and the third battery cell B3 are all higher than the low working temperature limit, step S513 is followed by step S517.

In step S515, the first voltage setting value, the second voltage setting value and the third voltage setting value are updated, so that the updated first voltage setting value, the updated second voltage setting value and the updated third voltage setting value are the same. Then, the control method of FIG. 5 returns to step S501.

Specifically, the updated first voltage setting value, the updated second voltage setting value and the updated third voltage setting value are all the same. When the first battery cell B1, the second battery cell B2 and the third battery cell B3 respectively reach the updated first voltage setting value, the updated second voltage setting value and the updated third voltage setting value, the first battery cell B1, the second battery cell B2 and the third battery cell B3 are switched from the unbalanced state to the balanced state.

In step S517, the first bidirectional charger BEC1, the second bidirectional charger BEC2 and the third bidirectional charger BEC3 are arranged to be in the cut-off state with the first battery cell B1, the second battery cell B2 and the third battery cell B3, respectively. Step S517 is followed by step S511.

Figure 6:
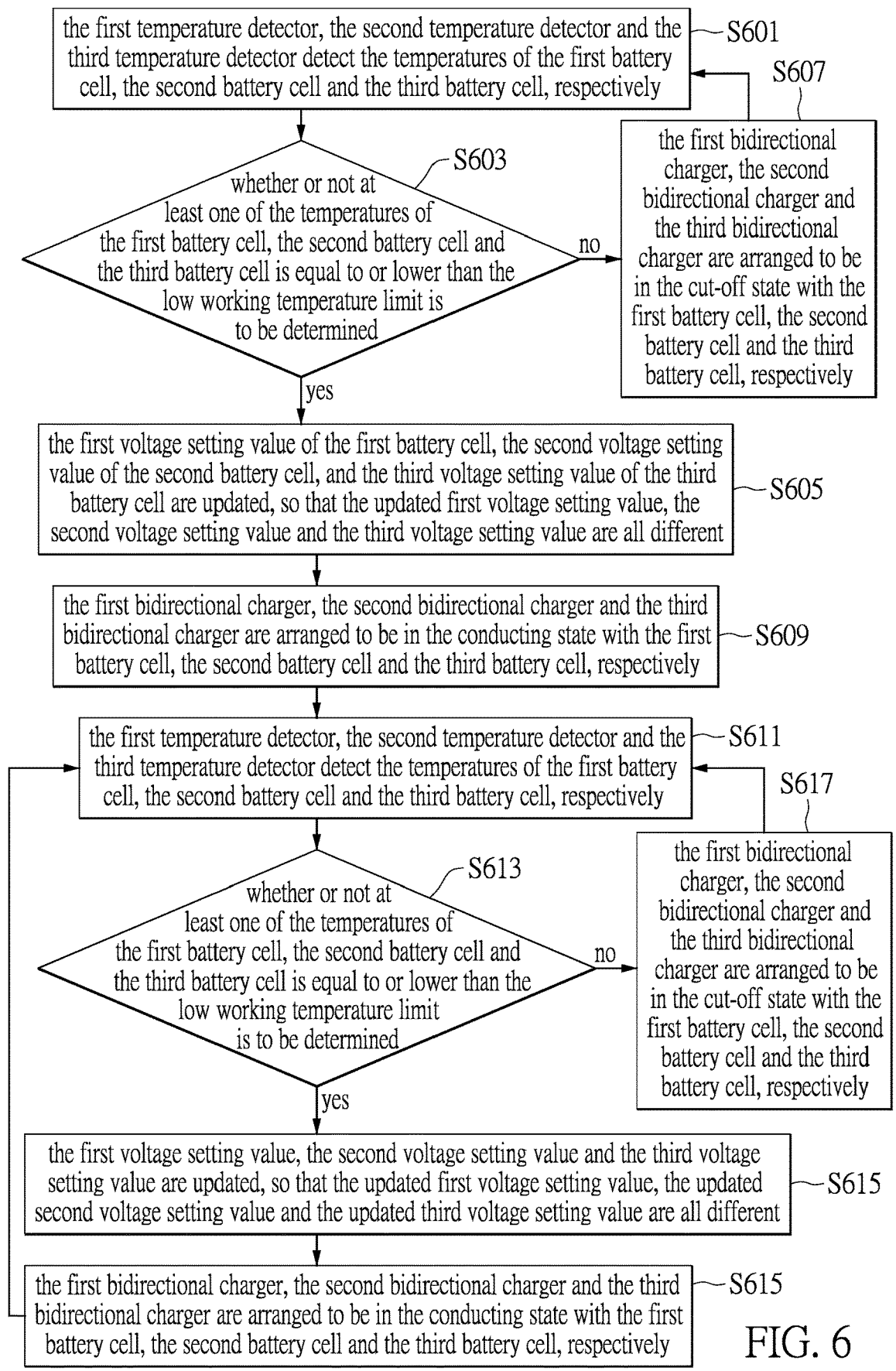
FIG. 6 is a flowchart of a control method of the autonomously activated electric energy storage device according to the second embodiment of the present disclosure.

FIG. 6 is a flowchart of a control method of the autonomously activated electric energy storage device according to the second embodiment of the present disclosure. Referring to FIG. 6, in step S601, the first temperature detector TD1, the second temperature detector TD2 and the third temperature detector TD3 detect the temperatures of the first battery cell B1, the second battery cell B2 and the third battery cell B3, respectively. Step S601 is followed by step S603. Specifically, the first voltage setting value of the first battery cell B1, the second voltage setting value of the second battery cell B2, and the third voltage setting value of the third battery cell B3 are all the same. When the first battery cell B1, the second battery cell B2 and the third battery cell B3 reach the same voltage setting value, the first battery cell B1, the second battery cell B2 and the third battery cell B3 are in the balanced state. For example, in the balanced state, the first voltage setting value, the second voltage setting value and the third voltage setting value are 3.2 volts, 3.2 volts and 3.2 volts, respectively.

In step S603, whether or not at least one of the temperatures of the first battery cell B1, the second battery cell B2 and the third battery cell B3 is equal to or lower than the low working temperature limit is to be determined. When at least one of the temperatures of the first battery cell B1, the second battery cell B2 and the third battery cell B3 is equal to or lower than the low working temperature limit, step S603 is followed by step S605. When the temperatures of the first battery cell B1, the second battery cell B2 and the third battery cell B3 are all higher than the low working temperature limit, step S603 is followed by step S607.

In step S605, the first voltage setting value of the first battery cell B1, the second voltage setting value of the second battery cell B2, and the third voltage setting value of the third battery cell B3 are updated, so that the updated first voltage setting value, the second voltage setting value and the third voltage setting value are all different. Then, step S605 is followed by step S609.

In step S607, the first bidirectional charger BEC1, the second bidirectional charger BEC2 and the third bidirectional charger BEC3 are arranged to be in the cut-off state with the first battery cell B1, the second battery cell B2 and the third battery cell B3, respectively. Then, the control method of FIG. 6 returns to step S601.

In step S609, the first bidirectional charger BEC1, the second bidirectional charger BEC2 and the third bidirectional charger BEC3 are arranged to be in the conducting state with the first battery cell B1, the second battery cell B2 and the third battery cell B3, respectively. Then, step S609 is followed by step S611.

In step S611, the first temperature detector TD1, the second temperature detector TD2 and the third temperature detector TD3 detect the temperatures of the first battery cell B1, the second battery cell B2 and the third battery cell B3, respectively. Step S611 is followed by step S613. Specifically, when the first battery cell B1, the second battery cell B2 and the third battery cell B3 respectively reach the updated first voltage setting value, the updated second voltage setting value and the updated third voltage setting value of step S605, the first battery cell B1, the second battery cell B2 and the third battery cell B3 are switched from the balanced state to the first unbalanced state.

In step S613, whether or not at least one of the temperatures of the first battery cell B1, the second battery cell B2 and the third battery cell B3 is equal to or lower than the low working temperature limit is to be determined. When at least one of the temperatures of the first battery cell B1, the second battery cell B2 and the third battery cell B3 is equal to or lower than the low working temperature limit, step S613 is followed by step S615. When the temperatures of the first battery cell B1, the second battery cell B2 and the third battery cell B3 are all higher than the low working temperature limit, step S613 is followed by step S617.

In step S615, the first voltage setting value, the second voltage setting value and the third voltage setting value are updated, so that the updated first voltage setting value, the updated second voltage setting value and the updated third voltage setting value are all different. Step S615 is followed by step S619. Specifically, when the first battery cell B1, the second battery cell B2 and the third battery cell B3 respectively reach the updated first voltage setting value, the updated second voltage setting value and the updated third voltage setting value of step S615, the first battery cell B1, the second battery cell B2 and the third battery cell B3 are switched from the first unbalanced state to the second unbalanced state.

For example, in the first unbalanced state, the first voltage setting value of the first battery cell B1, the second voltage setting value of the second battery cell B2, and the third voltage setting value of the third battery cell B3 are 2.5 volts, 3.5 volts and 3.6 volts, respectively. In the second unbalanced state, the first voltage setting value of the first battery cell B1, the second voltage setting value of the second battery cell B2, and the third voltage setting value of the third battery cell B3 are 3.5 volts, 2 volts and 4.1 volts, respectively.

In step S617, the first bidirectional charger BEC1, the second bidirectional charger BEC2 and the third bidirectional charger BEC3 are arranged to be in the cut-off state with the first battery cell B1, the second battery cell B2 and the third battery cell B3, respectively. Step S617 is followed by step S611.

In step S619, the first bidirectional charger BEC1, the second bidirectional charger BEC2 and the third bidirectional charger BEC3 are arranged to be in the conducting state with the first battery cell B1, the second battery cell B2 and the third battery cell B3, respectively. Step S619 is followed by step S611.

In addition, the quantity of the battery cells in the above-mentioned embodiments of the autonomously activated electrical energy storage device and the control method thereof is provided for illustrative purposes only, and the present disclosure is not limited thereto. The quantity of the battery cells in the autonomously activated electric energy storage device and the control method thereof can be N, and N is a positive integer greater than one. Further, there is no limitation as to how the multiple battery cells are connected with each other. For example, the quantity of the battery cells can be thirty-two. Sixteen of the thirty-two battery cells are connected in series with each other, and are connected in parallel with the remaining sixteen battery cells.

In the above-mentioned embodiments of the autonomously activated electrical energy storage device and the control method thereof, when the temperature of one of the battery cells is lower than or equal to the low working temperature limit, a power transfer mechanism is enabled. However, in other embodiments, an average temperature of the battery cells can also be used to enable the power transfer mechanism. In other words, when the average temperature of the first battery cell, the second battery cell and the third battery cell is lower than or equal to the low working temperature limit, the power transfer mechanism is enabled.

Beneficial Effects of the Embodiments

In conclusion, in the autonomously activated electric energy storage device and the control method thereof provided by the present disclosure, the power transfer between the first battery cell and the second battery cell can be continuously performed. When the power transfer is performed between the two battery cells, the energy level within each battery cell is changed, and the kinetic energy is generated by the change of the energy level. When the kinetic energy is generated within the battery cell, the battery cell can be switched from a resting state to the activated state. The temperature of the battery cell in the activated state is not easily decreased to be lower than the low working temperature limit due to environmental factors. Accordingly, even if the battery cell is in a low temperature environment, the power of the battery cell is not quickly lost and the life of the battery cell will not be damaged. In addition, each of the battery cells can be in the activated state completely through the continuous power transfer among the multiple battery cells (without through any external power). Based on the law of conservation of energy, no matter how the power is transferred, the total power of the battery cells remains unchanged, and a power-saving effect can also be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An autonomously activated electric energy storage device, comprising:
   a first battery cell;
   a second battery cell;
   a temperature detector electrically connected to the first battery cell or the second battery cell and configured to detect temperatures of the first battery cell and the second battery cell;
   a first bidirectional charger;
   a second bidirectional charger; and
   a control circuit, wherein the control circuit is connected to the first battery cell, the second battery cell, the temperature detector, the first bidirectional charger and the second bidirectional charger;
   wherein the first battery cell and the second battery cell respectively include a first voltage setting value and a second voltage setting value, the control circuit includes a first central processing circuit and a second central processing circuit, the first central processing circuit is electrically connected to the first bidirectional charger and the second bidirectional charger, and the second central processing circuit is electrically connected to the first battery cell, the second battery cell and the first central processing circuit;
   wherein, when the first central processing circuit determines that at least one of the temperatures of the first battery cell and the second battery cell is equal to or lower than the low working temperature limit, the first central processing circuit allows the first bidirectional charger to be electrically conducted with the first battery cell and the second bidirectional charger to be electrically conducted with the second battery cell, and instructs the second central processing circuit to update the first voltage setting value and the second voltage setting value, so as to control the first battery cell and the second battery to perform the power transfer therebetween through the first bidirectional charger and the second bidirectional charger until the temperatures of the first battery cell and the second battery cell are both higher than the low working temperature limit.

2. The autonomously activated electric energy storage device according to claim 1, wherein, when the first voltage setting value of the first battery cell is greater than the second voltage setting value of the second battery cell, a part of power of the second battery cell is transferred to the first battery cell; wherein, when the first voltage setting value is less than the second voltage setting value, a part of power of the first battery cell is transferred to the second battery cell.

3. The autonomously activated electric energy storage device according to claim 1, wherein the first bidirectional charger includes a first charging circuit and a first switch, and the first switch is connected between a first end of the first charging circuit and the first battery cell; wherein the second bidirectional charger includes a second charging circuit and a second switch, and the second switch is connected between a first end of the second charging circuit and the second battery cell; wherein a second end of the first charging circuit is connected to a second end of the second charging circuit, and the control circuit is connected to the first switch and the second switch, so as to control the first switch and the second switch to be switched from a conducting state to a cut-off state or from the conducting state to the cut-off state.

4. The autonomously activated electric energy storage device according to claim 1, further comprising a memory, wherein the memory is electrically connected to the control circuit, the memory stores a power transfer program, and the power transfer program includes the low working temperature limit, the first voltage setting value of the first battery cell and the second voltage setting value of the second battery cell.

5. The autonomously activated electric energy storage device according to claim 4, wherein the power transfer program further includes a maximum continuous charge current, a maximum continuous discharge current, a discharge peak current, a discharge peak time, an upper charge voltage limit and a discharge cutoff voltage.

6. The autonomously activated electric energy storage device according to claim 4, further comprising a wireless communication processing circuit, wherein the wireless communication processing circuit is electrically connected to the control circuit and is used to communicate with a remote device; wherein, when the wireless communication processing circuit receives a program update command from the remote device, the control circuit updates the power transfer program according to the program update command.

7. The autonomously activated electric energy storage device according to claim 1, further comprising a wireless communication processing circuit, wherein the wireless communication processing circuit is electrically connected to the control circuit and is used to communicate with a remote device, and the wireless communication processing circuit is used to transmit the temperatures of the first battery cell and the second battery cell to the remote device.

8. The autonomously activated electric energy storage device according to claim 1, further comprising a wireless communication processing circuit and a hydrogen detector, wherein the wireless communication processing circuit is electrically connected to the control circuit and is used to communicate with a remote device, the hydrogen detector is electrically connected to the control circuit, the hydrogen detector is used to detect a hydrogen concentration in the autonomously activated electric energy storage device, and the wireless communication processing circuit is used to transmit the hydrogen concentration to the remote device.

9. A control method of an autonomously activated electric energy storage device, comprising:
  detecting, by a temperature detector, temperatures of a first battery cell and a second battery cell;
  determining, by a first central processing circuit of a control circuit, whether or not at least one of the temperatures of the first battery cell and the second battery cell is equal to or lower than a low working temperature limit;
  wherein the first battery cell and the second battery cell respectively include a first voltage setting value and a second voltage setting value;
  wherein the first central processing circuit is electrically connected to a first bidirectional charger and a second bidirectional charger, and a second central processing circuit of the control circuit is electrically connected to the first battery cell, the second battery cell and the first central processing circuit; and
  allowing, by the first central processing circuit, when the at least one of the temperatures of the first battery cell and the second battery cell is equal to or lower than the low working temperature limit, the first bidirectional charger to be electrically conducted with the first battery cell and the second bidirectional charger to be electrically conducted with the second battery cell;
  instructing, by the first central processing circuit, the second central processing circuit to update the first voltage setting value and the second voltage setting value;
  controlling, by the first central processing circuit, the first battery cell and the second battery to perform the power transfer therebetween through the first bidirectional charger and the second bidirectional charger until the temperatures of the first battery cell and the second battery cell are both higher than the low working temperature limit.

10. The control method according to claim 9, wherein the step of controlling the first battery cell and the second battery cell to perform the power transfer therebetween includes: updating the first voltage setting value of the first battery cell and the second voltage setting value of the second battery cell when a voltage of the first battery cell is the same as a voltage of the second battery cell, so that the voltage of the first battery cell is different from the voltage of the second battery cell; and updating the first voltage setting value and the second voltage setting value again when the voltage of the first battery cell is different from the voltage of the second battery cell and the at least one of the temperatures of the first battery cell and the second battery cell is equal to or lower than the low working temperature limit, so that the voltage of the first battery cell is once again the same as the voltage of the second battery cell.

11. The control method according to claim 9, wherein the step of controlling the first battery cell and the second battery cell to perform the power transfer therebetween includes: updating the first voltage setting value of the first battery cell and the second voltage setting value of the second battery cell when a voltage of the first battery cell is different from a voltage of the second battery cell, so that the voltage of the first battery cell is the same as the voltage of the second battery cell; and updating the first voltage setting value and the second voltage setting value again when the voltage of the first battery cell is the same as the voltage of the second battery cell and the at least one of the temperatures of the first battery cell and the second battery cell is equal to or lower than the low working temperature limit, so that the voltage of the first battery cell is once again different from the voltage of the second battery cell.

12. The control method according to claim 9, wherein the step of controlling the first battery cell and the second battery cell to perform the power transfer therebetween includes: updating the first voltage setting value of the first battery cell and the second voltage setting value of the second battery cell for a first time when a voltage of the first battery cell is different from a voltage of the second battery cell, so that the voltage of the first battery cell is different from the voltage of the second battery cell; and updating the first voltage setting value and the second voltage setting value for a second time when the voltage of the first battery cell is different from the voltage of the second battery cell and the at least one of the temperatures of the first battery cell and the second battery cell is equal to or lower than the low working temperature limit, so that the voltage of the first battery cell is once again different from the voltage of the second battery cell.

13. The control method according to claim 12, wherein the first voltage setting value updated after the second time is different from the first voltage setting value updated after the first time, and the second voltage setting value updated after the second time is different from the second voltage setting value updated after the first time.

* * * * *